United States Patent
Meyers

(10) Patent No.: US 7,041,408 B1
(45) Date of Patent: May 9, 2006

(54) VARIED FUEL CELL OXIDANT FLOW CHANNEL DEPTH RESULTING IN FEWER COOLER PLATES

(75) Inventor: Jeremy P. Meyers, West Hartford, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 11/025,437

(22) Filed: Dec. 28, 2004

(51) Int. Cl.
 *H01M 8/04* (2006.01)
 *H01M 8/24* (2006.01)

(52) U.S. Cl. .............................. 429/26; 429/34; 429/39

(58) Field of Classification Search ...................... None
 See application file for complete search history.

(56) References Cited

U.S. PATENT DOCUMENTS 4,324,844 A * 4/1982 Kothmann ................... 429/26
6,833,211 B1 * 12/2004 Yang ........................... 429/26
2002/0064702 A1 * 5/2002 Gibb ........................... 429/34
2003/0059662 A1 * 3/2003 Debe et al. .................... 429/34

* cited by examiner

*Primary Examiner*—John S. Maples
(74) *Attorney, Agent, or Firm*—M. P. Williams

(57) ABSTRACT

In a fuel cell stack (11a), a larger number of fuel cells (18–21, 33–36) are interposed between successive cooler plates (13–15) without creating excessively high temperatures in those fuel cells (33–36) which are remote from the cooler plates, by virtue of increased air flow in air flow field channels (30a) which are deeper in fuel cells (30–36) remote from the cooler plates, compared with the flow field channels (30, 30b) which are in fuel cells (18–21) adjacent to the cooler plates. The thickness of air flow field plates (29b) may be increased to accommodate the increased depth of the air flow channels (30a). Fuel cells (18a) adjacent the cooler plate may have air flow field channels (30b) which are more shallow than normal whereby increased air utilization therein will be balanced by decreased air utilization in the cells (33–36, 33a) having deeper air flow channels (30a); in this case, the channels (30a) may be normal or deeper than normal.

2 Claims, 2 Drawing Sheets

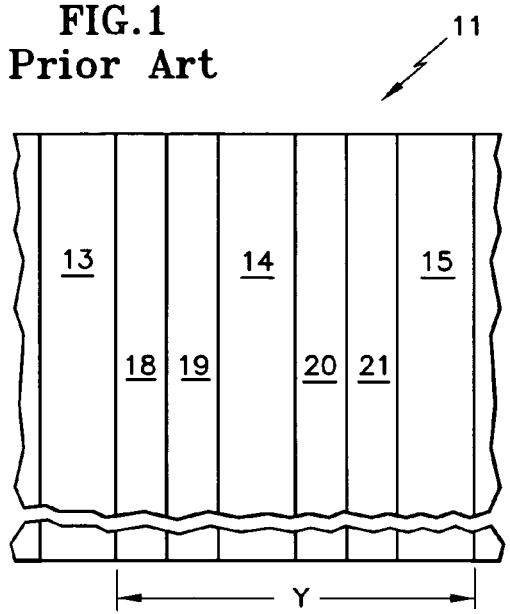
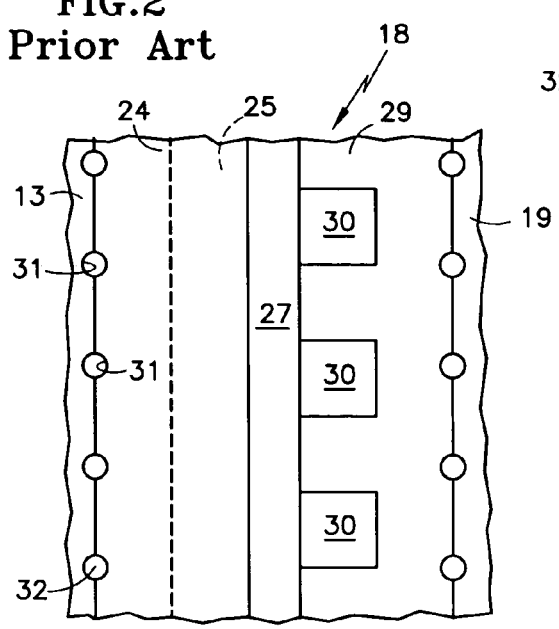
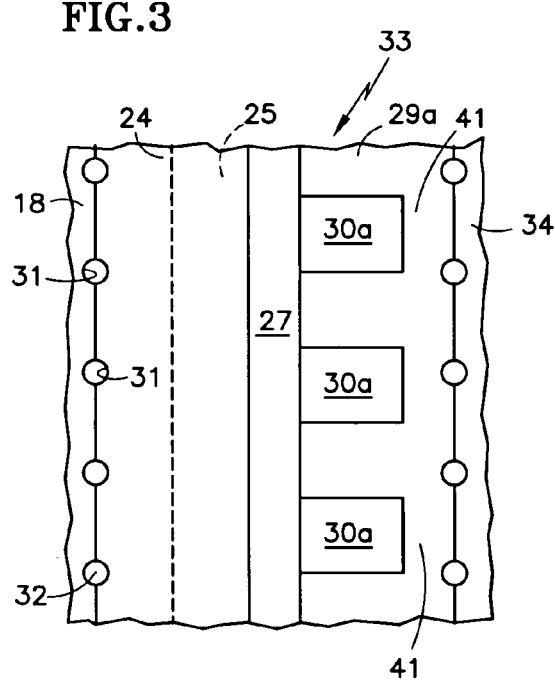

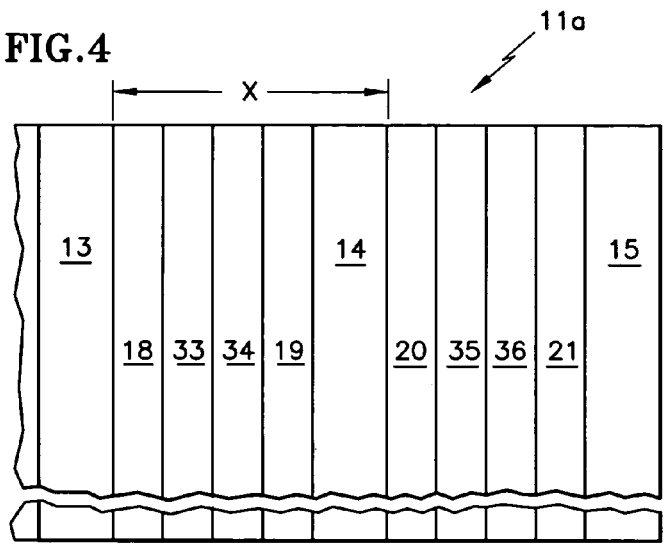
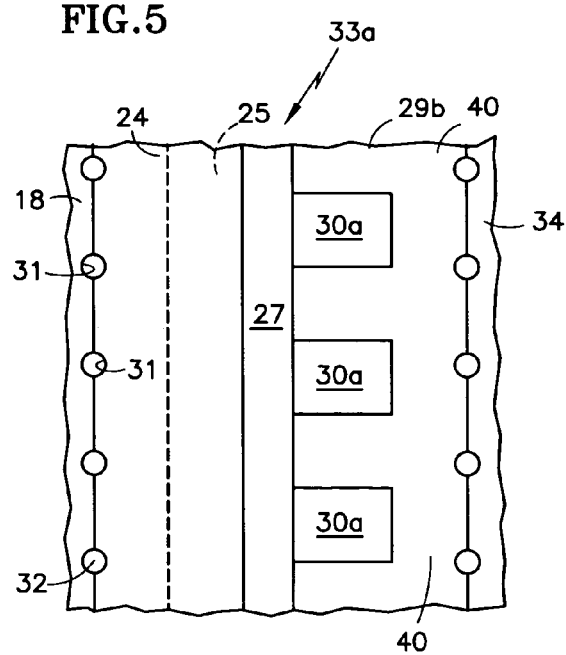
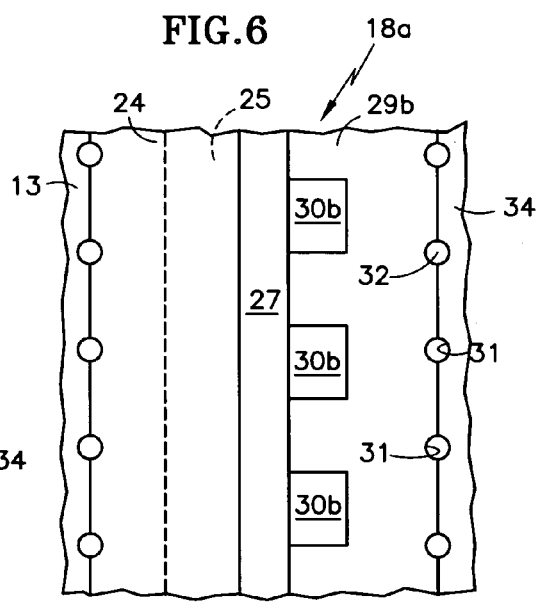

VARIED FUEL CELL OXIDANT FLOW CHANNEL DEPTH RESULTING IN FEWER COOLER PLATES

TECHNICAL FIELD

This invention relates to providing deeper oxidant flow channel depth in fuel cells which have a greater separation from cooler plates than fuel cells adjacent to the coolant plates, thereby permitting a greater number of fuel cells between successive cooler plates while maintaining average fuel cell stack temperature profiles and air utilization.

BACKGROUND ART

In various types of fuel cell stacks, whether anode and cathode water management is active (employing a pump) or passive (no pump) the stack is cooled by cooler plates which are separated by groups of fuel cells. In some fuel cell system designs, there may be as few as two fuel cells between successive cooler plates. Because the cooler plates do not contribute to the voltage or power of a fuel cell stack, the power density of the fuel cell system and end-to-end voltage of the stack correlate inversely with the number of cooler plates which are used in the stack. The overall size of the fuel cell stack becomes critical in fuel cells designed for automotive use.

If more fuel cells are interposed between successive cooler plates, the fuel cells further away from the cooler plates, particularly at the centers of said fuel cells, experience higher temperatures, which impacts overall fuel cell stack water balance, and reduces life in membranes or other temperature sensitive components. Overall stack water balance depends on the exit temperature of the oxidant, due to the impact on partial pressure of water vapor leaving the stack in the oxidant outflow, and on the overall oxidant utilization of the stack.

DISCLOSURE OF INVENTION

Objects of the invention include: a fuel cell stack having more fuel cells per coolant plate, thus reducing overall stack size; reducing the size of a fuel cell stack while maintaining a suitable temperature profile across the fuel cell stack; increased power and voltage density of fuel cell stacks; and improved fuel cell stacks suitable for automotive use.

According to the present invention, a fuel cell stack includes a plurality of cooler plates, each having a group of fuel cells interposed therebetween, fuel cells which are remote from the coolant plates having a greater oxidant flow channel depth than that of fuel cells adjacent to the cooler plates, whereby to improve cooling in those fuel cells remote from the cooler plates. By increasing evaporative cooling in those fuel cells which are remote from the cooler plates, the temperature of those remote fuel cells can be controlled close to the design operating temperature of the fuel cells.

The invention permits reducing the size of a fuel cell stack, by using fewer cooler plates, while maintaining a suitable average temperature and average air utilization.

In another embodiment of the invention, the depth of the oxidant flow field channels may be reduced in those fuel cells which are adjacent to the cooler plates, with increased cooling provided thereto by the cooler plates (such as by running the coolant at a lower temperature), thereby to conduct more heat from fuel cells that are remote from the cooler plates; the remote cooler plates may have deeper than normal or normal oxidant flow field channels in that case, though deeper than normal is currently preferred.

In implementing the present invention, it may, in some cases, be deemed advisable to cause the oxidant gas flow field plates to be slightly thicker in the fuel cells that are remote from the cooler plates and have deeper oxidant flow field channels, so as to avoid manufacturing tolerance problems and excessive brittleness.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 1 is a simplified, fragmentary side elevation view of a fuel cell stack known to the art.

FIG. 2 is a simplified, side elevation view of a fuel cell known to the prior art, which may be adjacent to a cooler plate.

FIG. 3 is a simplified, fragmentary side elevation view of a fuel cell with deep oxidant flow field channels according to the invention.

FIG. 4 is a simplified, fragmentary side elevation view of a fuel cell stack incorporating the present invention.

FIG. 5 is a simplified, fractional side elevation view of a fuel cell having an oxidant flow field plate of increased thickness as well as increased oxidant flow field channel depth, according to the invention.

FIG. 6 is a simplified, fragmentary side elevation view of a fuel cell having reduced depth oxidant flow field channels in accordance with the invention, which may be adjacent to a cooler plate.

MODE(S) FOR CARRYING OUT THE INVENTION

Referring to FIG. 1, a fuel cell stack 11 includes a plurality of cooler plates, cooler plates 13–15 being shown. The stack 11 also includes a large number of fuel cells, only fuel cells 18–21 being shown. Each of the fuel cells 18–21 is adjacent one of the cooler plates 13–15, there being only two fuel cells between each pair of cooler plates.

The fuel cell 18 is illustrated by way of example, and not to relative or perfect scale. Each fuel cell includes a hydrophilic, porous fuel gas reactant flow field plate 24 with hydrophilic, porous fuel flow field channels 25 therein. Each fuel cell also includes an electrolyte assembly 27, which in the case of a proton exchange membrane polymer electrolyte membrane (PEM) fuel cell includes a membrane and catalysts on either side thereof. Each fuel cell also includes an oxidant gas flow field plate 29 which includes oxidant gas flow channels 30. Each reactant gas flow field plate 24, 29 has grooves 31 therein which together form water transport channels 32. The fuel cell 18 partially depicted in FIG. 2 is disposed between the cooler plate 13 and the fuel cell 19.

In accordance with the invention, a fuel cell 33 illustrated in FIG. 3 includes an oxidant gas flow field plate 29a having oxidant flow channels 30a which are deeper than the channels 30. The fuel cell 33, for instance, may be disposed between the fuel cell 18 and another fuel cell 34, similar to the fuel cell 33, with deeper channels 30a in accordance with the invention. FIG. 4 illustrates that additional fuel cells 35, 36 with deeper reactant gas channels 30a may be disposed between the fuel cells 20, 21, so that there are four fuel cells between each of the cooler plates 13, 14; 14, 15; etc.

In accordance with the invention, the fuel cells 33–36, being remote from the cooler plates 13–15, derive less conductive cooling from the cooler plates 13–15 but are provided with additional evaporative cooling due to increased flow of oxidant, such as air, in the larger, deeper oxidant flow field channels 30*a* than occurs in the fuel cells 18–21 adjacent the cooler plates which have less deep oxidant flow field channels 30. In this fashion, the temperature of the fuel cells 33–36 can be controlled to be within the desired range of an optimum operating temperature. It is obvious by comparison of dimension X in FIG. 4 with dimension Y in FIG. 1 that four fuel cells 18, 19, 33, 34; together with the related cooler plate 14 occupy less space than do the four fuel cells 18–21 and their related cooler plates 14, 15. The difference per four fuel cells is the width of one cooler plate, in this example.

The invention is disclosed in a PEM fuel cell embodiment, which may be suitable for automotive use, but may be used in other types of fuel cell systems. The description thus far assumes two fuel cells per cooler plate in the prior art and four fuel cells per cooler plate in accordance with the invention. However, these are merely exemplary, and fuel cell stacks having other numbers of fuel cells between cooler plates may be improved by utilizing the increased depth of oxidant flow field channels of the invention so as to have additional fuel cells between cooler plates.

FIG. 5 illustrates an alternative cooler plate 29*b* in a fuel cell 33*a*. In FIG. 5, the ungrooved portion 40 of the oxidant flow field plate 29*b* is thicker than is the ungrooved portion 41 of the plate 29*a* in FIG. 3. This results from making the plate 29*b* as thicker than the plate 29*a*, perhaps by as much as the grooves 30*a* are deeper than the grooves 30. The option to use a thicker plate 29*b* will, of course, reduce the space savings of the present invention, but it will preserve the stability of each of the cathode oxidant gas flow field plates 29*b*.

A further embodiment of the invention is shown in FIG. 6. Therein, a fuel cell 18*a* has an oxidant flow field plate 29*b* with flow field channels 30*b* which are more shallow than the flow field channels 30. This reduces the internal cooling by condensation, allowing the cooler plate to be run at a cooler temperature, thus to maintain the desired temperature balance. The shallow channels with a cooler plate at a lower temperature provide more conductive heat removal not only to the fuel cells 18*a*, etc. adjacent to the cooler plates but also to the fuel cells 33–36 which are remote from the cooler plates.

Decreasing air flow in the fuel cell 18*a* (and similarly modified fuel cells adjacent to the cooler plates) increases air utilization in these fuel cells, allowing decreased air utilization (greater flow) in those fuel cells 33–36 which are remote from the cooler plates.

The invention may be understood in comparison with "normal" fuel cells. Herein, the term "normal" means fuel cells of the type which all have the same depth of oxidant reactant gas flow field channels and resulting in fuel cell stacks of larger than desired length as are known to the prior art. The contrast to normal is found in fuel cells remote from the cooler plates which have oxidant flow field channels of a depth greater than those of the fuel cells adjacent to the cooler plates, which may or may not be deeper than normal. If shallower than normal channels are used in oxidant flow field plates adjacent to the cooler plates, then normal fuel cells may be used remotely of the cooler plates.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A fuel cell stack comprising:
   a plurality of cooler plates;
   a plurality of fuel cells disposed in groups between successive ones of said cooler plates, there being a first pair of fuel cells in each group each of said first fuel cells being adjacent to a respective one of said cooler plates, there being one or more second fuel cells in each group remote from said cooler plates and contiguous with two other fuel cells, said first pair of fuel cells having hydrophilic, porous oxidant reactant gas flow field plates with channels of a first depth, said second fuel cells having hydrophilic, porous oxidant reactant gas flow field plates with channels which are deeper than said first depth, whereby to provide flow of oxidant gas in said second fuel cells to aid in the cooling thereof which is greater than the flow of oxidant reactant gas in said first fuel cells.

2. A fuel cell stack according to claim 1 wherein:
   an oxidant reactant gas flow field plate of said at least one second fuel cell is thicker than the oxidant reactant gas flow field plates of said first fuel cells.

\* \* \* \* \*